United States Patent [19]

Lyon et al.

[11] 4,397,436

[45] Aug. 9, 1983

[54] DEVICE FOR SECURING AT LEAST ONE CABLE, PIPE OR OTHER ELONGATE MEMBER

[75] Inventors: Robert C. Lyon, Wigan; Peter Fearns, Huyton, both of England

[73] Assignee: BICC Limited, London, England

[21] Appl. No.: 291,779

[22] Filed: Aug. 10, 1981

[30] Foreign Application Priority Data

Aug. 13, 1980 [GB] United Kingdom ............... 8026429
Jan. 12, 1981 [GB] United Kingdom ............... 8100829
Feb. 19, 1981 [GB] United Kingdom ............... 8105271

[51] Int. Cl.³ .............................................. F16L 3/22
[52] U.S. Cl. ............................... 248/68 R; 24/68 R; 24/269; 248/74 B
[58] Field of Search .................. 248/68 R, 73, 74 R, 248/74 B, 499, 492, 493, 495; 24/269, 71–72, 68 R, 68 B

[56] References Cited

U.S. PATENT DOCUMENTS

| | | | |
|---|---|---|---|
| 993,444 | 5/1911 | Fergunson | 24/269 |
| 1,490,618 | 4/1924 | McKinney | 24/269 |
| 1,627,172 | 5/1927 | Gouirand et al. | 24/269 |
| 2,502,714 | 4/1950 | Garnett | 248/499 X |
| 3,129,994 | 4/1964 | Harmon et al. | 24/269 X |
| 3,556,447 | 1/1971 | Jenkins | 248/68 R X |

*Primary Examiner*—William E. Lyddane
*Assistant Examiner*—Ramon O. Ramirez
*Attorney, Agent, or Firm*—Buell, Blenko, Ziesenheim & Beck

[57] ABSTRACT

A device for securing at least one cable to a support (not shown) and/or for securing together two or more cables comprising a base member having two inclined surfaces on which and or two of the cables can rest; a bar which is spaced from the base member between the inclined surfaces and extends lengthwise of the cable or cables and which is secured to the base member; a strap which can be passed around the bar and the cable or cables at least once; and tensioning means which can tension the strap when positioned around the bar and the cable or cables, to secure the cable or cables together and/or to secure the cable or cables to the base member.

3 Claims, 14 Drawing Figures

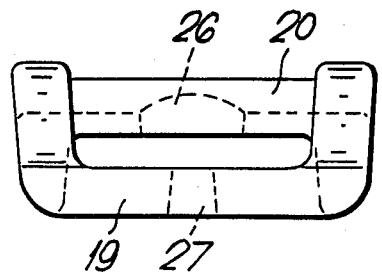
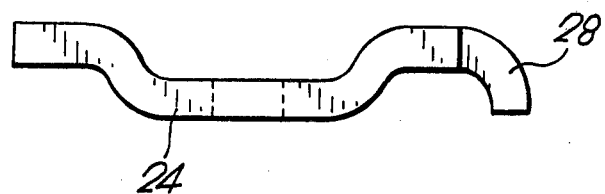
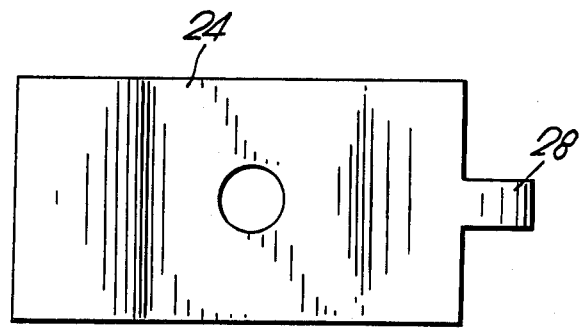

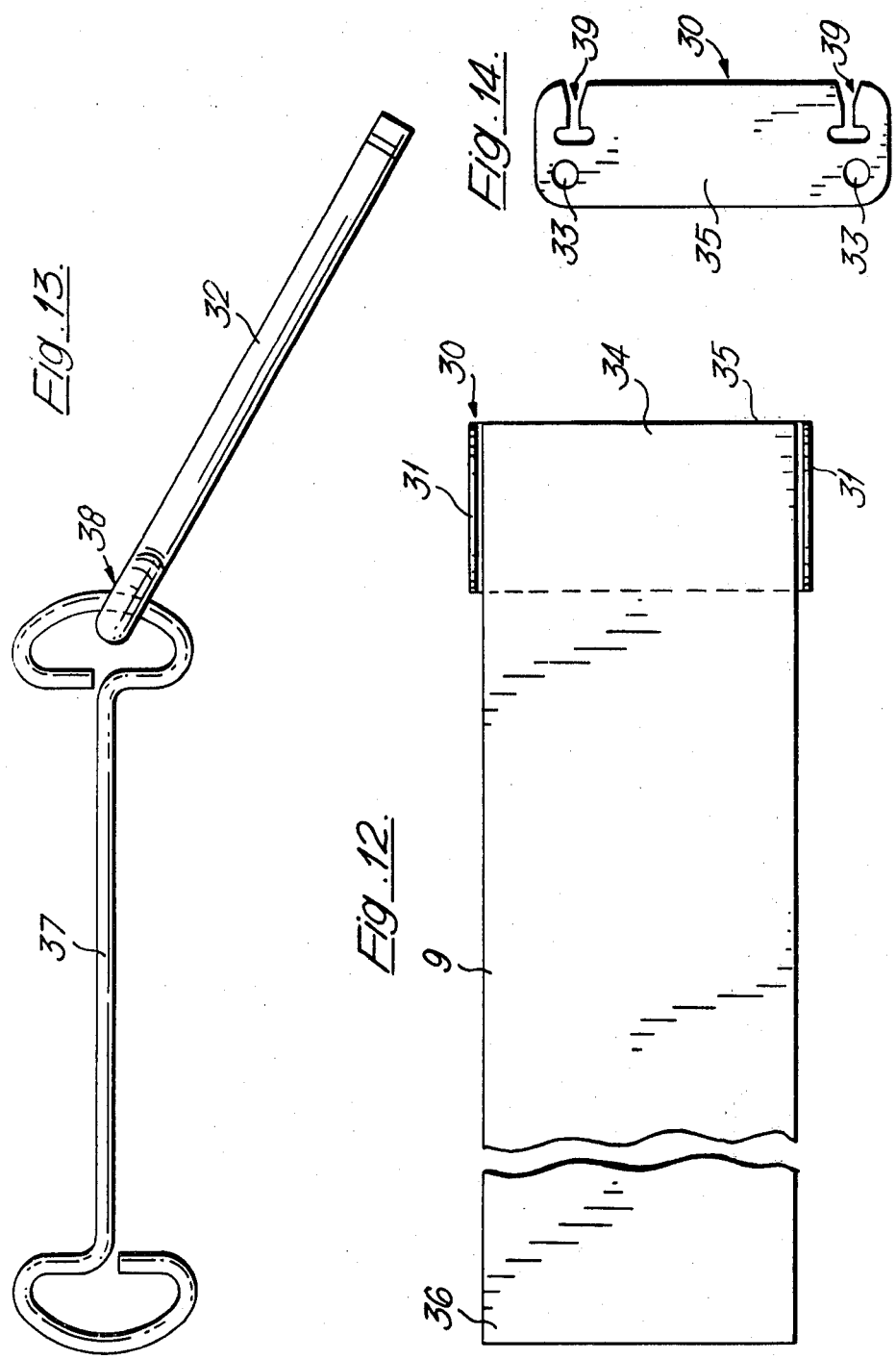

DEVICE FOR SECURING AT LEAST ONE CABLE, PIPE OR OTHER ELONGATE MEMBER

BACKGROUND OF THE INVENTION

This invention relates to a device for securing at least one cable, pipe or other elongate member to a support and/or for securing together two or more cables, pipes or other elongate members, for convenience, hereinafter being included in the term "cable".

In installing single-core electric power cables in cable networks of industrial plant, it is the general practice to arrange three single-core power cables alongside one another with their axes passing through the apices of a triangle, such an arrangement usually being referred to as a trefoil cable group. A trefoil cable group is usually secured to a cable ladder by means of cleats and, at spaced positions between the cleats, the cables of the group are secured together by cable straps or ties. Present arrangements have the disadvantage that for different sizes of cables different sizes of cable straps and cleats have to be used.

A cable securing device is also known in which a strap is wrapped around the cables to secure them together, one end of the strap being fixed to a plate having a rotatable split rod, and the free end of the strap being held in the slit in the rod. When the rod is rotated the strap is tensioned around the cables to secure them together. This arrangement has the disadvantage that in use there is nothing to prevent the rod rotating to loosen the strap.

It is an object of the present invention to provide a device for securing at least one cable to a support and/or for securing together two or more cables which is capable of accommodating a greater range of cable sizes, and which remains secured when in use.

SUMMARY OF THE INVENTION

According to the present invention the device comprises a base member having two support surfaces which are inclined to each other on which the or two of the cables can rest; a bar secured to and spaced from the base member longitudinally between the inclined surfaces and extending lengthwise of the cable or cables; a flexible strap of a length to pass around the bar and the cable or cables at least once; and tensioning means to tension the strap around the bar and the cable or cables, to secure the cable or cables together and/or to secure the cable or cables to the base member.

Preferably the base member having two inclined surfaces and the bar around which the strap passes are integral.

The inclined surfaces may be defined by an arcuate surface or two arcuate surfaces, but preferably they are two planar surfaces. Preferably the surfaces of the bar are also inclined.

When the device is in use for securing two or more cables it is preferable that the strap is passed around the bar and the cables at least twice in order to prevent the strap cutting into one or more of the cables due to any outward lateral movement of one of the cables (for example, as occurs when an electric cable is subjected to a high level short circuit current).

The strap is preferably made of stainless steel. The base member is preferably made of cast metal or metal alloy, and is preferably capable of being secured to a cable ladder or other supporting surface.

In accordance with another aspect of the invention, a device for securing at least one cable to a member selected from a support and at least one other cable comprises a flexible strap of a length to pass around the at least one cable at least once, and tensioning means to tension the strap, the tensioning means comprising a plate, walls upstanding at opposite ends of the plate, the distance between said walls being greater than the width of the strap and the upstanding walls having aligned apertures; a rod extending through both the aligned apertures and having a longitudinally extending slit; and locking means operable to allow and to prevent rotation of the rod in the apertures. This arrangement is such that in use one end of the strap of the securing device is fastened to the plate (for example by welding), and, after the strap has passed one or more times around or cables to be secured and the rod has been positioned in the apertures in the upstanding walls of the plate, the free end of the strap is passed through the slit in the rotatable rod, the rod is rotated to tension the strap and the locking means is then used to prevent further rotation (either tightening or loosening the strap) of the rod.

The plate is preferably made of stainless steel.

The rod is preferably a stainless steel split pin. In this case the locking means preferably comprises a key which engages in the eye of the split pin and can be used to rotate the split pin, and the upstanding walls of the plate preferably have aligned slots such that after rotation of the split pin the key can be turned over to engage in the aligned slots to prevent further rotation of the split pin.

This device can be used for securing a cable or cables to a supporting surface and/or for securing together any number of cables, and is capable of accommodating a greater range of cable sizes than the known cleats, with four sizes of this device replacing at least thirty-three sizes of known cleats.

DESCRIPTION OF THE DRAWINGS

The invention is further illustrated, by way of example, with reference to the accompanying drawings in which:

FIG. 7 is a side view of the base member and integral bar shown in FIG. 6;

FIGS. 8 and 9 are side and top views respectively of the adaptor shown in FIG. 5;

FIGS. 11 and 12 are top and side views respectively of the strap and plate shown in FIG 10;

FIG. 13 is a view of the key and split pin used with the plate and strap shown in FIGS. 11 and 12; and FIG. 14 is a developed view of the plate shown in FIGS. 11 and 12.

DESCRIPTION OF THE PREFERRED EMBODIMENTS

Figure 1:
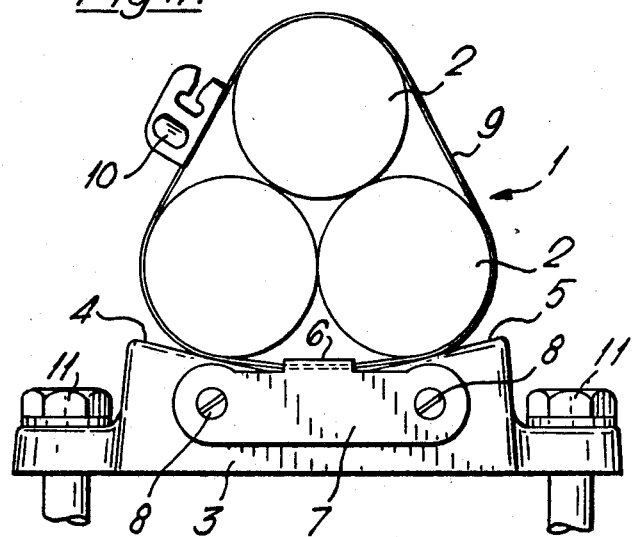
FIGS. 1 and 2 are end and side views respectively of a device in accordance with the invention.
Figure 2:
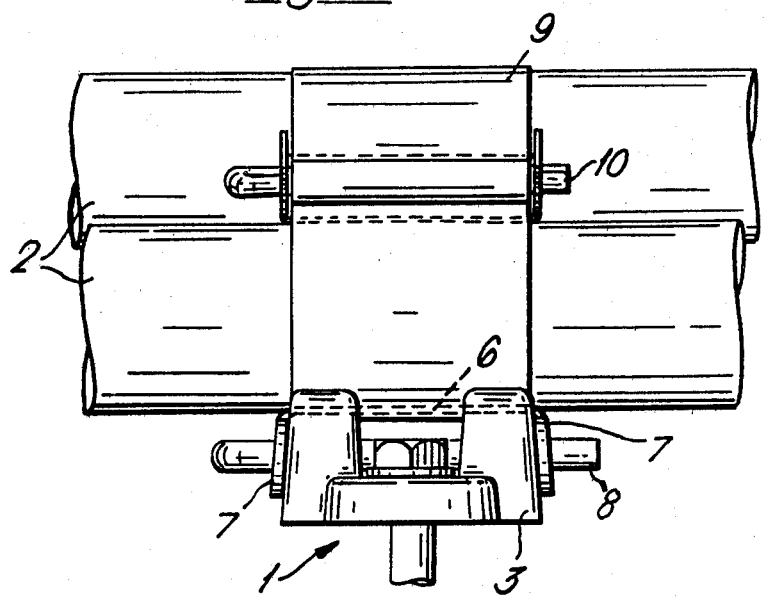

Referring to FIGS. 1 and 2, the device 1 for securing three cables 2 together and for securing them to a support (not shown) comprises a base member 3 having two inclined surfaces 4,5 on which two of the cables rest, a bar 6 provided by the central limb of a substantially U-shaped member 7 which is secured to the base member 3 by split pins 8, such that the bar 6 is spaced from the base member 3 between the inclined surfaces 4,5 and extends lengthwise of the cables 2. The cables 2 are secured by a stainless steel strap 9 which passes around the cables and the bar 6 and which is tensioned by a rotatable split pin arrangement 10 (described in more detail later). The base member 3 is secured to a support (e.g a cable ladder) by bolts 11.

Figure 3:
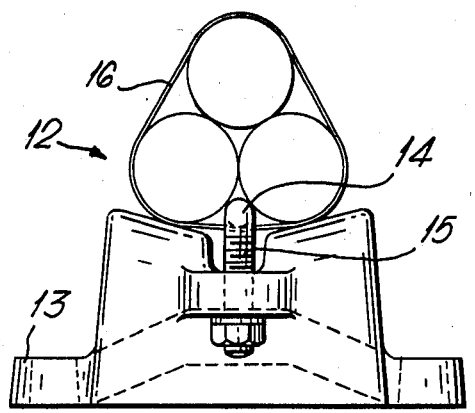
FIGS. 3 and 4 are end and side views respectively of a second device in accordance with the invention.
Figure 4:
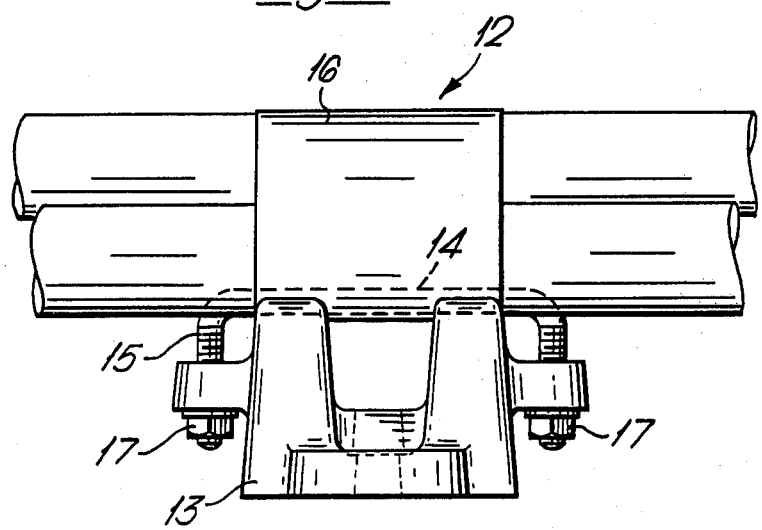

A similar arrangement is shown in FIGS. 3 and 4 in which the device 12 comprises a base member 13, a bar 14 provided by the central limb of a U-bolt 15 secured to the base member 13, a stainless steel strap 16 and tensioning means (which is omitted for clarity). Further tensioning may be provided by adjusting the nuts 17 on the U-bolt 15.

A third arrangement is shown in FIGS. 5 to 9 inclusive. In this arrangement the device 18 comprises a base member 19 which is integral with a bar 20, both of which have inclined surfaces 21, 22, a stainles steel strap 23, 23 and tensioning means (which is omitted for clarity). An adaptor 24 is also shown which allows the base member 19 to be secured to a support (not shown) by a single bolt 25, access to which can be made through aperture 26 in the base member 19 before the cables are secured in position. Without this adaptor 24, the base member 19 can still be secured in the usual way through bolt holes 27. A hooked portion 28 on the adaptor 24 engages in one of the bolt holes 27 to prevent the device 18 sliding if mounted vertically.

Figure 5:
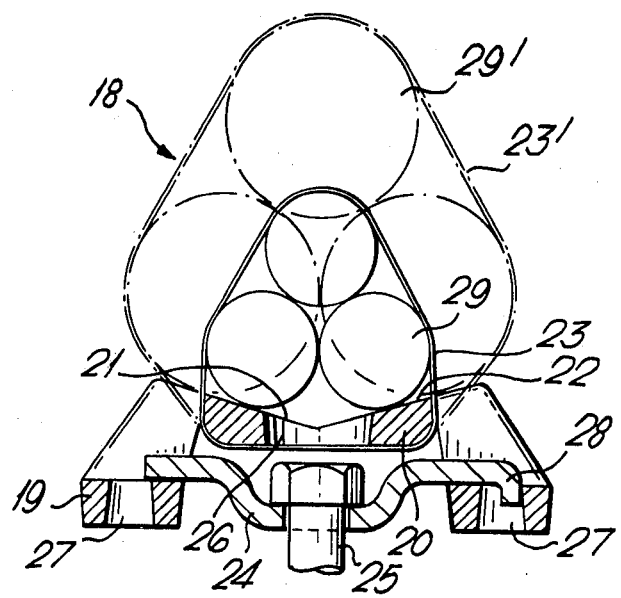
FIG. 5 is a cross-section view on the line V—V in FIG. 6 of a third device in accordance with the invention.
Figure 6:
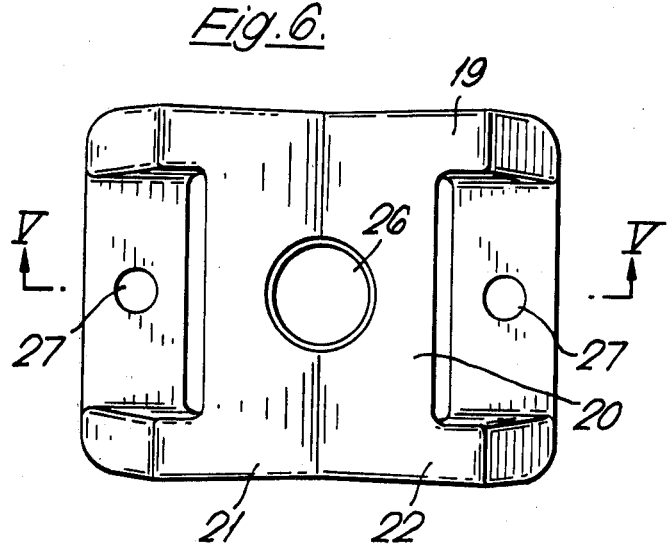
FIG. 6 is a top view of the base member with the integral bar of the device shown in FIG. 5, with the adaptor, strap, tensioning means and cables omitted for clarity.
Figure 10:
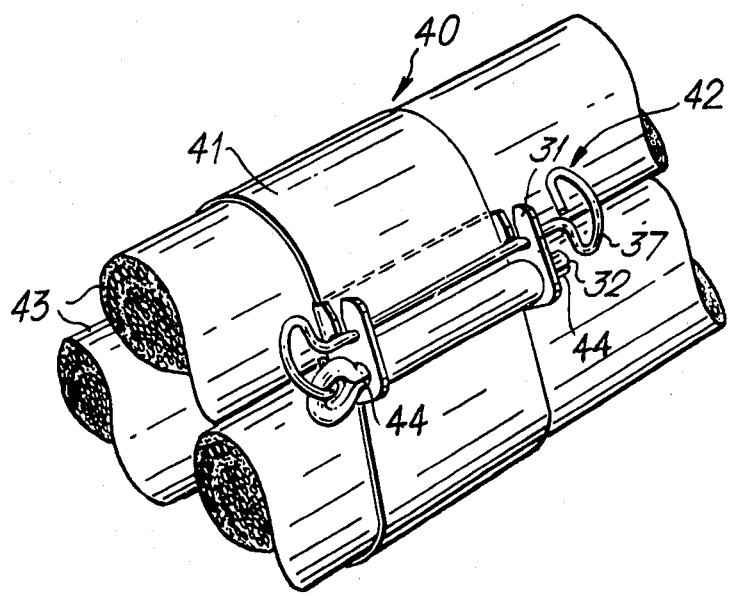
FIG. 10 is a perspective view of another securing device in accordance with the invention.
Figure 11:
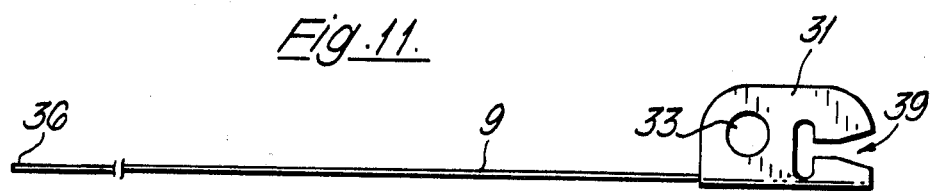

The range taking capability of these devices is emphasised in FIG. 5, which shows how three cables 29 of one size can be secured, and the alternative of securing three cables 29' of a larger size using the same device.

Another form of securing device 40 is now described with reference to FIGS. 10 to 14 inclusive. In this case the device 40 comprises a stainless steel strap 41 and tensioning means 42. The tensioning means 42 comprises a stainless steel plate 30 having upstanding walls 31 at each end between which the strap 41 passes. A rod, in the form of a stainless steel split pin 32 having a longitudinally slit 44 is rotatably secured in aligned apertures 33 in the upstanding walls 31 of the plate 30. In this arrangement one end 34 of the strap 41 is welded to the central portion 35 of the plate 30. The free end 36 of the strap 41 is passed around the cables 43 to be secured together and then passed through the slit in the split pin 32. Rotating the split pin 32 winds the strap 41 around the split pin and thereby tensions the strap around the cables 43. Locking means is provided by a key 37 which engages in the eye 38 of the split pin 32 and can be used to assist in rotating the split pin, and which can lock the split pin by being turned over to engage in aligned slots 39 in the upstanding walls 31 of the plate 30.

This tensioning means can also be used in the arrangements shown in FIGS. 1 and 2, in FIGS. 3 and 4 and in FIGS. 5 to 9.

The device 40 can also be used in conjunction with a bar defined by, for example, a rung of a cable ladder, or the central portion of a U-bolt, for securing a cable or cables to the bar.

What we claim as our invention is:

1. A device for securing at least one cable to a support comprising a base member having two support surfaces for said at least one cable, which support surfaces are inclined with respect to each other; a bar secured to and spaced from said base member longitudinally between said inclined surfaces and extending lengthwise of said at least one cable; a flexible strap of a length to pass around said bar and said at least one cable at least once; and tensioning means to tension said strap around said bar and said at least one cable, said tensioning means comprising a plate, walls upstanding at opposite ends of said plate, the distance between said walls being greater than the width of said strap and said upstanding walls having aligned apertures; a rod in the form of a split pin extending through both said aligned apertures and having an eye at one end and a longitudinally extending slit; and locking means operable to allow and to prevent rotation of said rod in said apertures, said locking means comprising a key which engages in said eye, and said walls having aligned slots, which said key enters to prevent rotation of said split pin.

2. A device as claimed in claim 1 in which said inclined surfaces are planar.

3. A device for securing at least one cable to a member selected from a support and at least one other cable comprising a flexible strap of a length to pass around said at least one cable at least once, and tensioning means to tension said strap around said at least one cable, said tensioning means comprising a plate, walls upstanding at opposite ends of said plate, the distance between said walls being greater than the width of said strap and said upstanding walls having aligned apertures; a rod in the form of a split pin extending through both said aligned apertures and having an eye at one end and a longitudinally extending slit; and locking means operable to allow and to prevent rotation of said rod in said apertures, said locking means comprises a key which engages in said eye, and said walls have aligned slots, which said key enters to prevent rotation of said split pin.

* * * * *

UNITED STATES PATENT AND TRADEMARK OFFICE
CERTIFICATE OF CORRECTION

PATENT NO. : 4,397,436
DATED : August 9, 1983
INVENTOR(S) : Robert C. Lyon and Peter Fearns It is certified that error appears in the above-identified patent and that said Letters Patent is hereby corrected as shown below:

In the Abstract, the fourth line, after "which", "and" should be --the--.

Column 3, line 50, after "longitudinally", --extending-- should be inserted.

Signed and Sealed this

First Day of November 1983

[SEAL]

Attest:

Attesting Officer

GERALD J. MOSSINGHOFF

Commissioner of Patents and Trademarks